United States Patent

[11] 3,587,175

[72] Inventor Fontaine C. Armistead
 Darien, Conn.
[21] Appl. No. 727,141
[22] Filed Apr. 30, 1968
[45] Patented June 28, 1971
[73] Assignee Texaco Inc., New York, N.Y.

[54] METHOD AND APPARATUS FOR BOREHOLE DIRECTIONAL LOGGING
 20 Claims, 15 Drawing Figs.
[52] U.S. Cl. .................................................. 33/205,
 33/204
[51] Int. Cl. ................................................. E21b 47/022,
 G01c 9/00, G01c 9/14, G01c 9/06, G01c 17/30, G01c 19/38
[50] Field of Search ........................................ 33/205.5
 (E), 205, 204 (.4)

[56] References Cited
 UNITED STATES PATENTS
| | | | |
|---|---|---|---|
| 1,928,970 | 10/1933 | Johnston ....................... | 33/205.5(E) |
| 1,950,946 | 3/1934 | Minorsky ...................... | 33/204(.4) |
| 2,635,349 | 4/1953 | Green ............................. | 33/205.5(E) |

FOREIGN PATENTS
| | | | |
|---|---|---|---|
| 719,812 | 10/1965 | Canada ......................... | 33/205 |
| 907,490 | 7/1945 | France ......................... | 33/204(.4) |

Primary Examiner—Robert B. Hull
Attorney—K. E. Kavanagh, Thomas H. Whaley and Robert J. Sanders, Jr.

ABSTRACT: A method and apparatus for borehole directional logging. The apparatus includes a first coil adapted for rotation about an axis aligned with the longitudinal axis of the borehole and a gimbal mounted magnetic field producing coil for generating a first magnetic field of predetermined direction with respect to the vertical in the space occupied by the first coil whereby an alternating signal is induced therein representative of the inclination angle of the borehole. A second coil is provided for rotation at the same rate as the first coil while being subjected to a second magnetic field having at least a component of known azimuth direction, thereby generating an alternating signal in the second coil, the phase angle of which, with respect to the first coil signal is representative of the azimuth angle of the borehole. Computing apparatus is shown for determining the location of a selected segment of the borehole at any depth including mathematical and trigonometric function operators for generating signals representative of the incremental changes of the borehole position and of the corresponding incremental length segments along the borehole. Also included are computing elements for summing the latter signals thereby obtaining the location of the borehole at any depth. The method includes generating first and second signals representative of the borehole inclination and azimuth, respectively, and in response thereto generating signals of the incremental changes in the location of successive segments of the borehole correlated with a signal representative of the length of said segments, and generating signals representative of the borehole location along its length by summing the latter signals.

METHOD AND APPARATUS FOR BOREHOLE DIRECTIONAL LOGGING

BACKGROUND OF THE INVENTION

This invention relates to a method and apparatus for borehole directional logging and in one particular embodiment it relates to a method and apparatus for determining the position of a borehole at any given depth.

In drilling for petroleum and for prospecting for other mineral deposits, it is of great practical importance to have information of the position of the borehole along its length with respect to the starting point thereof on the earth's surface. This information is useful for many purposes, particularly to insure that the borehole remains within a predetermined land area measured at the surface. Other uses include prospecting wherein core samples taken of the earth's strata may be correlated with the position of the hole, and geological data in accordance therewith may be prepared to aid in locating petroleum and other mineral deposits.

When a borehole is drilled through various earth formations, it has a tendency to deviate from the vertical and accordingly it drifts to the side to an extent which depends upon the angle of borehole drift, or deviation from the vertical direction thereof, which is also referred to and hereinafter will be referred to as its inclination angle. In order to determine the position of the borehole it is necessary to know the magnitude of the inclination angle and its direction, that is, the compass direction or azimuth angle, of the drift with respect to a suitable reference direction, such as, for example, magnetic north. This angle will hereinafter be referred to as the azimuth angle.

Various instruments have been proposed to perform all or part of the foregoing measurements, such as those incorporating electromagnetically coupled hanging pendulums, or coils, which provide information only of the angle of inclination of the borehole, and others which combine the aforementioned electromagnetic hanging elements with a single rotating coil wired to provide information of the inclination and azimuth angles of the borehole. Some of the disadvantages of such prior art devices are that they are rather inaccurate, provide only intermittent information of inclination and azimuth angles, and in some instances they are dependent upon the assumption that the earth's magnetic field remains constant in intensity and direction. However, the earth's magnetic field along the length of the borehole is often subject to variations of magnitude and direction due to variations in the composition of the earth's strata and the occasional presence of magnetic materials therein. Frequently, such variations do not acutely manifest themselves and tend to be erroneously recorded by the instrument as deviations of the borehole. A further disadvantage of the aforementioned prior art devices is that they provide information only of the inclination and azimuth angles of the borehole and not of its actual position in the earth. To determine the latter, it is necessary to plot or chart the former information manually at the surface which is time consuming and further adds to the inaccuracy of such prior art techniques.

The present invention overcomes the aforementioned disadvantages by providing a method and apparatus for determining the borehole inclination and azimuth angles, which in one embodiment is independent of the earth's magnetic field, and in one embodiment includes unique computing means determining the actual position of any selected segment of the borehole along its length.

SUMMARY

Briefly stated, one aspect of the present invention involves a logging instrument for the directional logging of a borehole which includes a first coil mounted for rotation about an axis substantially in alignment with the axis of the borehole. Means are provided for rotating the first coil about said axis. Means are also provided for generating a first magnetic field of predetermined direction with respect to the vertical in at least part of the space occupied by the first rotating coil thereby inducing therein a first alternating electrical signal representative of the inclination angle of the borehole. Also included is a second coil mounted for rotation at the same rate as the first coil. The second coil is subjected to a second magnetic field with a horizontal component of known azimuth direction, whereby a second alternating electrical signal is induced therein, the phase angle of which with respect to the first coil signal is representative of the azimuth angle of the borehole with respect to the magnetic field component of known azimuth direction. In one embodiment, the second magnetic field is provided by magnetic means coupled with a gyrocompass which maintains the magnetic means in a known compass alignment. In another embodiment, the second magnetic field is the earth's field.

Another aspect of the invention involves a method for logging a borehole which comprises the steps of; generating first and second signals representative, respectively, of the borehole inclination and azimuth angles, at various positions along the length of the borehole, generating a signal representative of the incremental changes of length along the borehole, and in response to the aforementioned signals and in accordance with trigonometric relationships, generating further signals representative of the incremental changes of location of the borehole segments in correlation with the corresponding incremental length segments in accordance with a convenient coordinate system such as, for example, cylindrical coordinates, and generating signals representative of the location of a selected segment of the borehole at any depth, expressed in the aforementioned coordinate system, by summing the aforementioned incremental signals in reference to that depth.

Another aspect of the present invention involves the provision of novel computing apparatus in combination with the aforementioned logging instrument for directional logging of a borehole by generating information of the borehole location in reference to coordinates having origin at the starting point of the borehole on the earth's surface. Computer input means are provided for receiving the first and second signals from the logging instrument, and for generating signals representative of the incremental borehole length segments through which the logging instrument is traversed. The computer includes mathematical operators and trigonometric function operators responsive to the azimuth angle, inclination angle, and incremental length signals, for generating signals representative of the incremental change of the location of the borehole segments through the aforementioned incremental lengths, and summing means for summing the latter signals of the incremental changes of location and for providing signal outputs corresponding to the location of a selected segment of the borehole at any depth.

In view of the foregoing it is an object of the invention to provide an improved method and apparatus for the directional logging of boreholes.

Another object of the invention is to provide an improved method and apparatus for the directional logging of boreholes independent of the magnetic field of the earth.

Another object of the invention is to provide a method and apparatus for the directional logging of a borehole determining its position in the earth at any depth.

Another object of the invention is to provide embodiments of an improved borehole logging instrument which generates information of the inclination and azimuth angles of the borehole.

These and other objects, advantages and features of the invention will be more fully understood by referring to the following description and claims taken in conjunction with the accompanying drawings.

DESCRIPTION OF THE PREFERRED EMBODIMENTS

Figures 3, 4:
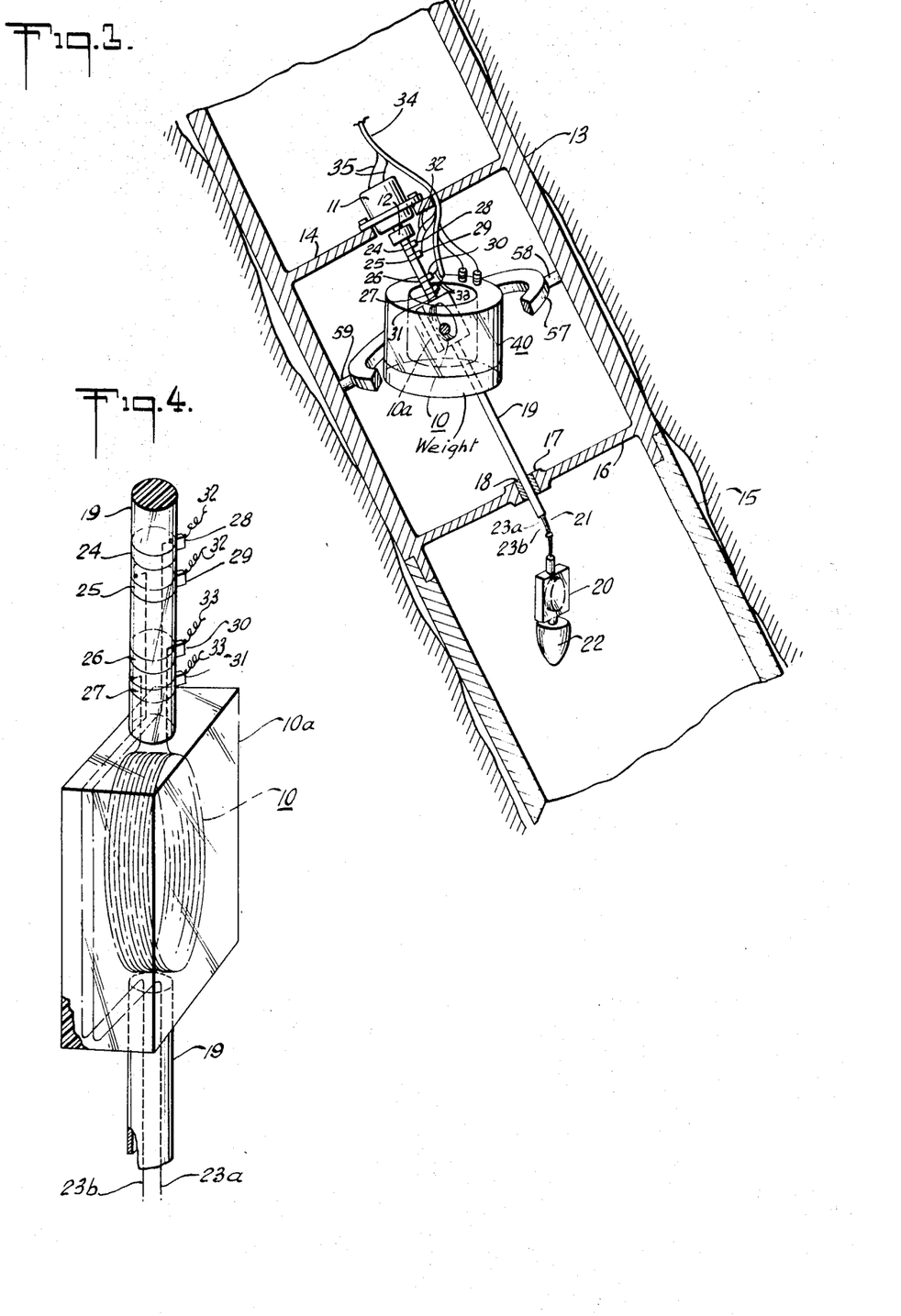
FIG. 3 is a cross-sectional view of one embodiment of the logging instrument of the invention, incorporating a compass coil and an inclination coil, illustrated in an inclined portion of a borehole.
FIG. 4 is an oblique view illustrating in further detail the inclination coil of the logging instrument shown in FIG. 3.
Figure 5:
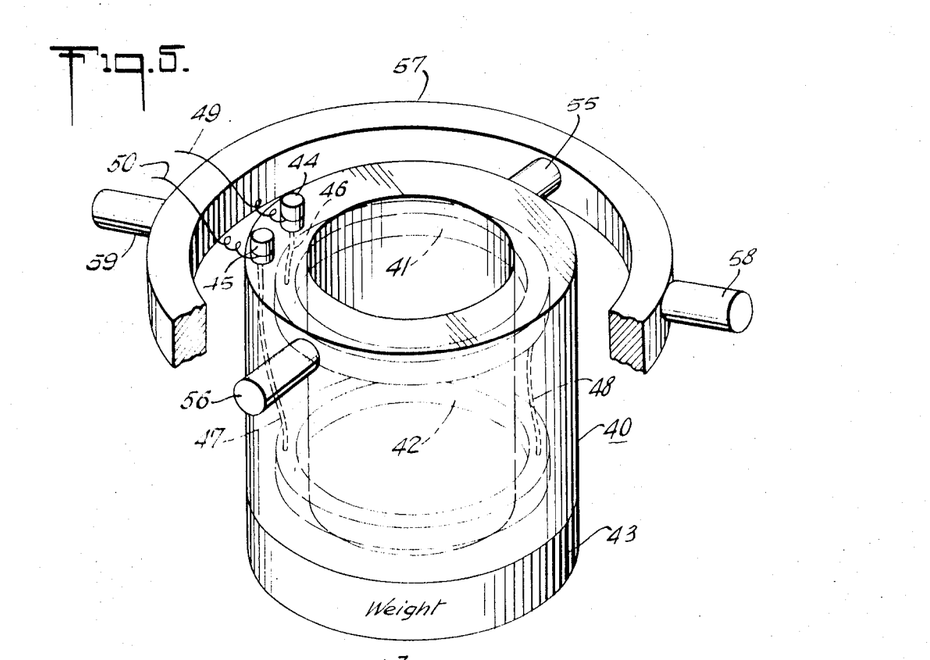
FIG. 5 is an oblique view illustrating in further detail a portion of the instrument in FIG. 3, particularly the Helmholtz coil and its mounting provisions which may be used for generating a vertical magnetic field intersecting the inclination coil.

Referring now to FIG. 3 which is a cross-sectional view of one embodiment of the logging instrument of the present invention illustrated in an inclined portion of a borehole, a first rotating coil 10, also herein referred to as the inclination coil, is provided containing a number of turns of wire embedded in a suitable potting material and is coupled, by a coupling 12, with a constant speed electric motor 11, such as, for example, a synchronous motor. An upper instrument case 13 is provided from which extends a flange 14 to which is mounted the motor 11. The upper instrument case is made of a magnetically permeable material thereby shielding the first coil 10 from the earth's magnetic field. A lower instrument case 15 is provided which is made of a nonmagnetic material, such as aluminum or plastic, and which is joined to the upper instrument case 13 thereby forming a continuous cylinder therewith. The upper and lower instrument cases 13 and 15, respectively, are of a circular cylindrical shape having an outside diameter as close to the borehole size as free axial movement therethrough permits and the combined length of the case 13, 15 is sufficient so that alignment of the instrument case as a whole with the borehole axis is assured. Also, to assure alignment centralizers may be used on the upper and lower respective portions of the case 13, 15, whereby a smaller exterior shape of the case would be satisfactory. A flange 16 of magnetically permeable material extends from the lower portion of the upper instrument case 13. In the flange 16 is mounted a bearing support 17 in which is mounted a bearing 18 which rotatably supports a hollow shaft 19 which is in turn fixed to the lower portion of the inclination coil 10. The motor 11 and the bearing support 17 are mounted to their respective support flanges 14 and 16 in a manner so that the axis of rotation of the hollow shaft 19 is in parallel alignment with the outer surface of the instrument case 13, 15, whereby the axis of rotation of the inclination coil 10 is in substantial alignment with the axis of the borehole. A Helmholtz coil 40, the details of which are illustrated in FIG. 5, is provided surrounding the inclination coil 10 and which generates a magnetic field parallel to its central axis. The Helmholtz coil 40 is gimbally mounted to the upper instrument case 13 so that it maintains its central axis in a vertical orientation whereby the rotating inclination coil is subjected to magnetic flux lines of a substantially vertical direction. Since the alternating signal provided by the inclination coil may be calibrated with respect to the inclination of the instrument case 13, 15 any magnetic field producing means which is maintained in a constant orientation with respect to the vertical may be used. However, since a homogeneous vertical magnetic field is preferred, a Helmholtz coil is a preferred simple device for obtaining such a field.

When the instrument case 13 is in a vertical orientation that is, when it is in a borehole having no inclination, the Helmholtz coil 40 aligns itself with the axis of rotation of the inclination coil 10 whereby the inclination coil during its rotation cuts flux lines of the Helmholtz coil magnetic field in a manner that develops equal and opposite voltages with the result that no net voltage is induced in the inclination coil. When the instrument case 13 is tilted through an angle, such as it would assume in a borehole having some inclination, the axis of the Helmholtz coil assumes an angle with respect to the axis of rotation of the borehole. Therefore, in its rotation, the inclination coil cuts flux lines of the Helmholtz coil magnetic field in a manner that develops a net voltage which is related to the angle of inclination of the borehole. It can be seen that the voltage induced in the inclination coil is related to the sine of the inclination angle thus: $(E_{inc})_{avg} = K_{inc} \sin \Phi_1$   (1)
where:

$(E_{inc})_{avg}$ = the average value of the alternating voltage induced in the inclination coil, $K_{inc}$ = a constant which depends on the number of turns, the area, and the rotational rate of the inclination coil, the magnetic field strength generated by the Helmholtz coil, and a numerical constant for converting peak value to average value, and $\Phi_1$ = the angle between the field of the Helmholtz coil and the axis of rotation of the inclination coil, which angle can be seen to be the same as the inclination angle of the borehole.

Since the magnitude of the voltage induced in the inclination coil is used to measure the borehole inclination angle it is best practice to calibrate the instrument before its use. One way in which this may be done is to tilt the instrument through a known inclination angle and to measure the average AC voltage generated by the inclination coil, and using this information to solve for $K_{inc}$ in accordance with the above relationship thus:

$$K_{inc} = \frac{[(E_{inc})_{avg}]_{cal}}{[\sin \phi_i]_{cal}} \quad (2)$$

where $[(E_{inc})_{avg}]_{cal}$ = the average AC voltage measured when the instrument is operated at a known inclination angle $(\Phi_1)_{cal}$ for purposes of calibration.

A second rotating coil 20, also herein referred to as the compass coil, is provided which is similar in construction to the inclination coil and also contains a number of turns of wire. The compass coil 20 is driven by a flexible shaft 21 which is attached to the lower end of the shaft 19 and rotates about a vertical axis at the same rotational rate as the inclination coil 10. Attached to the lower portion of the compass coil 20 is a plumb bob 22 for keeping it vertical. The shaft 21 is transversely flexible but rotationally rigid such as, for example, an automobile speedometer cable, whereby the compass coil 20 is caused to rotate at the same rate as the inclination coil 10 about a vertical axis under the influence of the weight of its plumb bob 22. The shaft 19 is sufficiently long so as to pass through its bearing 18 and extend sufficiently below the flange 16 so that the compass coil 20 rotates within the lower instrument case 15 where it is exposed to the earth's magnetic field. Therefore, there is induced in the compass coil 20 an alternating electrical signal which passes through zero each time the plane of the compass 20 is aligned perpendicular to the north-south magnetic axis. This alternating signal is carried by a pair of flexible leads 23 a and 23b through the hollow shaft 19 up to slip rings 24 and 25 on the upper portion of the shaft 19. Also on the shaft 19 are slip rings 26 and 27 which are connected to the leads of the inclination coil 10. Contacting the aforementioned slip rings are brushes 28, 29, 30 and 31, respectively, which, for the purpose of clarity, are illustrated without mounting provisions. It is to be understood that the brushes are mounted in an insulated manner to the flange 14 and that they need not be in any particular angular orientation around the shaft 19 since the slip rings 24—27 are electrically continuous around the shaft. Two pairs of signal wires 32 and 33 are connected to the brushes and respectively carry the signals induced in the compass coil 20 and the inclination coil 10. The four signal wires 32, 33 pass through an opening in the flange 14 and are tied together to form a harness 34 which continues upward to the earth's surface or optionally, to electronic equipment integrally mounted with the logging instrument. Also provided in the wire harness 34 are wires 35 to provide power to the motor 11.

It is to be appreciated by one skilled in the art that it is not essential that the compass coil 20 be suspended on a flexible shaft but might in another embodiment be mounted on a rigid shaft so that its axis of rotation is the same as that of the inclination coil 10. Such an embodiment would provide a signal from the compass coil whose strength would vary with the inclination of the instrument. This is not a serious drawback since it is only the phase and not the amplitude which is used to determine the azimuth angle of the borehole. However, in such an embodiment the phase angle between the compass coil and inclination coil signals is not in general equal to the desired azimuth angle but is related to it by a mathematical formula, i.e.; equation (7A) or (7B) as explained below.

In order for the phase relationship or phase angle between the signals of the compass coil 20 and the inclination coil 10 to be representative of the azimuth angle of the borehole it is necessary only that the two coils retain a fixed rotational orientation with respect to each other. A preferred embodiment, however, is one where the two coils are coplanar under the condition of no borehole inclination, that is when the instrument case 13, 15 is in a vertical position.

The description of the following steps best illustrates the operation of this preferred embodiment. (1) Assume that the instrument and its shaft 19 are placed in a start position, for example, with the normal to the compass coil plane along the north-south direction. Under this condition, when there is no inclination of the instrument the compass coil 20 rotating in the earth's magnetic field generates an alternating voltage which passes through zero every time the coil is parallel to its start position orientation. Under this condition the inclination coil 10 generates no alternating voltage, since its axis of rotation is aligned with the direction of the Helmholtz coil field, namely, in a vertical orientation, and further since the coil 10 is shielded from the earth's magnetic field by the upper instrument case 13. (2) When the instrument is tilted several degrees from the vertical in the direction of magnetic north the inclination coil in its rotation cuts some of the vertical magnetic flux lines generated by the Helmholtz coil in a manner such that a net alternating voltage is induced in the inclination coil which passes through zero at the same time as the alternating voltage induced in the compass coil. In this instance, the alternating voltages induced in the two rotating coils are in phase since the borehole inclination is in a magnetic north-south direction. (3) When the instrument is tilted the same angle from the vertical as in the preceding example but in a direction perpendicular to the magnetic north direction, the compass coil generates the same alternating voltage as in the preceding example, but the voltage induced in the inclination coil is out of phase with the compass coil voltage and passes through zero each time the normal to the inclination coil plane has its horizontal projection aligned with the azimuth direction of the borehole inclination. Therefore, in this example, the inclination coil voltage is 90° out of phase with the compass coil voltage. It can be seen from the above examples that the magnitude of the inclination coil voltage is a measure of the borehole angle of inclination, and the phase angle between the inclination coil and compass coil voltages is equal to the azimuth angle of the borehole.

Referring now to FIG. 4 which is an oblique view illustrating an embodiment of the inclination coil which may be used in the logging instrument, the upper and lower portions of the hollow shaft 19 are illustrated broken away. The inclination coil 10 is illustrated as a plurality of windings cast in a suitable potting compound 10a which for the purpose of clarity is illustrated as a block of transparent plastic. Fixed to the lower portion of the block 10a is the hollow shaft 19 which carries the signal wires 23a and 23b from the compass coil. These wires are also potted in the block and are carried to the upper portion thereof. Extending from the upper portion of the block 10a is the upper portion of the shaft 19 which is preferably potted integrally with the block 10a and made of a suitable insulating material so that the sliprings 24—27 may be integrally cast therewith. The lower pair of sliprings 26 and 27 are connected with the inclination coil 10 by a pair of leads in the shaft 19. The upper pair of sliprings 24 and 25 are connected with the compass coil 20 by the leads 23a and 23b which are cast in the upper portion of the shaft 19 and in the block 10a and pass through the hollow lower portion of the shaft 19 to the compass coil below.

It is to be appreciated by one skilled in the art that the construction of the inclination coil and the compass coil may be varied. All that is necessary is that the coil windings be suitably supported for rotation and the signal leads insulated.

The compass coil 20 shown in FIG. 3 may be similarly embodied as the inclination coil except that attached to its lower portion is the plumb bob 22, and extending from its upper portion are the flexible signal leads 23a, 23b and the flexible shaft 21.

Referring now to FIG. 5 which is an oblique view of a Helmholtz coil and its mounting provisions which may be used in the logging instrument for generating a vertical magnetic field, two coils 41 and 42 are shown, in axial alignment and spaced apart, each of which contains a plurality of electrical windings. The coils 41 and 42 are cast in a hollow cylinder 40 of a suitable potting compound which for the purpose of clarity is illustrated as a clear plastic material. Also cast in the cylinder 40, in the lower portion thereof, is a weight 43 in the form of a ring. A pair of terminals 44 and 45 are provided in the upper portion of the cylinder 40 to which are respectively connected a pair of flexible leads 49 and 50 which are in turn connected to a source of direct current electrical power not shown. The coils 41 and 42 are series connected to the terminals 44 and 45 by wires 46, 47 and 48 cast in the hollow cylinder 40. When a DC voltage is applied to the leads 49 and 50 the coils 41 and 42 generate a magnetic field in the hollow cylinder 40 which is parallel to the axis of the cylinder. Extending radially from the upper portion of the cylinder 40 are a pair of pivot ends 55 and 56 which are diametrically opposed. The cylinder 40 is balanced and aligned so that when it is freely suspended from the pivot ends 55 and 56 its magnetic axis assumes a vertical position. A gimbal ring 57 is provided engaging the pivot ends 55 and 56 and which incorporates pivot ends 58 and 59 disposed so that the axis between the latter pivot ends is perpendicular to the axis between the pivot ends 55 and 56 so that when the gimbal ring is freely suspended from its pivot ends 58 and 59, the Helmholtz coil cylinder 40 has 2° of pivotal freedom so that its magnetic axis assumes a vertical position under the influence of the weight 43. The pivot ends 58 and 59 are in turn pivotally mounted in the upper instrument case 13 as illustrated in FIG. 3. It should be noted that while a simple pivotal and gimbal mount have been disclosed that any form of mounting the Helmholtz coil may be used which provides it with the aforementioned degrees of pivotal freedom such as ball bearings, knuckle joints, or the like.

The apparatus discussed above in reference to FIGS. 3, 4 and 5 involves subjecting the inclination coil to a first magnetic field having vertical flux lines and further involves subjecting the compass coil to the earth's magnetic field. It will now be shown that in a more general sense a directional logging apparatus may be provided in accordance with this invention wherein the two magnetic fields relied upon for generating the directional signals may be magnetic fields lying in any arbitrary direction. It is merely necessary that the direction of these fields be known.

Figure 6:
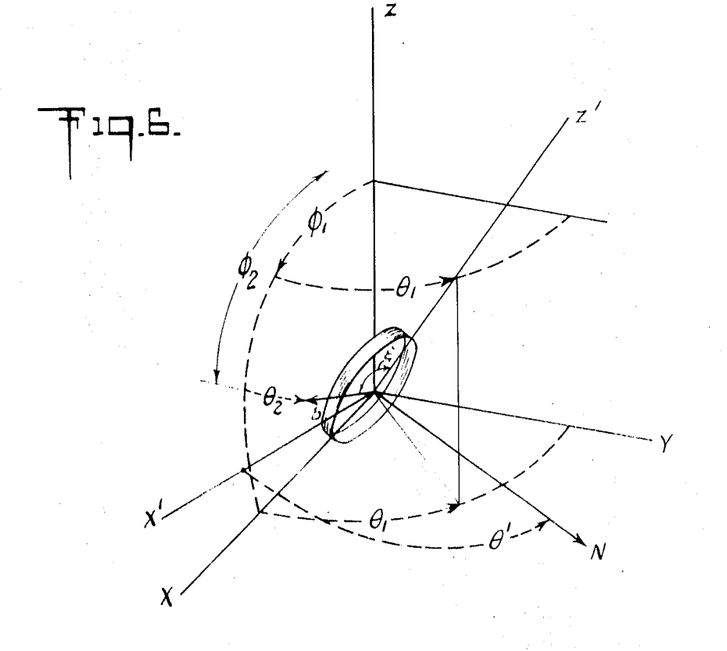
FIG. 6 is an oblique view of a three-dimensional coordinate system and trigonometric construction illustrating the general case of a rotating induction coil, which may be used as the inclination coil or the compass coil, being subjected to a magnetic field of arbitrary direction.

FIG. 6 illustrates the general case of an induction coil subjected to a magnetic field of arbitrary direction. There is shown a coordinate system, $x$, $y$, $z$, fixed with respect to the earth, $z$ being vertical, and $x$ some reference direction in the horizontal plane, e.g. the horizontal projection of the earth's magnetic field commonly called magnetic north. A coil of area $A$ and $n$ turns is centered at the origin of $x$, $y$, $z$, and rotates at an angular velocity $\omega$ about an axis $z'$ which coincides with a diameter of the coil. Axis $z'$ is directed at an angle $\Phi_1$ from the $z$ axis, and the plane of $zz'$ is at an angle $\theta_1$ from the $xz$ plane. Uniform magnetic induction B lies in any general direction $b$ which is defined by the angular coordinates $\Phi_2$ and $\theta_2$. The axis $x'$ is defined as lying in the $bz'$ plane and being normal to $z'$. The running value of the rotation of the coil is $\theta'$, i.e. the angle which the normal N to the coil has rotated from $x'$. The angle $\xi$ between $z'$ and $b$ is given by the equation:

$\cos \xi = \sin \Phi_1 \cos \theta_1 \sin \Phi_2 \cos \theta_2 + \sin \Phi_1 \sin \theta_1 \sin \Phi_2 \sin \theta_2 + \cos \Phi_1 \cos \theta_2$ \quad (3)

It should be noted that $\Phi_1$ and $\theta_1$ change slowly compared to $\theta'$; $\Phi_2$ and $\theta_2$ are constant.

The flux of induction through the coil is
Flux = $AB \sin \xi \cos \theta'$
and the induced E.M.F. E is:

$E = n \dfrac{d \text{ Flux}}{dt}$, which for $\dfrac{d\epsilon}{dt}$ small compared to $\dfrac{d\theta'}{dt}$, and for uniform $\dfrac{d\theta'}{dt} \equiv \omega$, and for $nAB\omega = K$ provides:

$E = K \sin \xi \sin \theta'$ \quad (4)

Equation (4) reduces to equations (5), (6), (8), and (9) for the following cases of special interest.

CASE I

Is defined as the case in which the magnetic field $B_I$ is vertical: $B_I = (B_I)_z$, $\Phi_2 = 0$ Equation (3) gives $\xi = \Phi_1$ and
$E_I = nA\omega(B_I)_z \sin \Phi_1 \sin \theta_I'$ \quad (5)

CASE II

Is defined as the case in which the magnetic field $B_{II}$ is horizontal: $B_{II} = (B_{II})_x$, $\Phi_2 = \pi/2$, $\theta_2 = 0$
$\cos \xi = \sin \Phi_1 \cos \theta_1$
$\sin \xi = \sqrt{1 - \sin^2 \Phi_1 \cos^2 \theta_1}$ and
$E_{II} = nA\omega(B_{II})_x \sqrt{1 - \sin^2 \Phi_1 \cos^2 \theta_1} \sin \theta_{II}'$ \quad (6)

where in the foregoing equation:
$\theta_I'$ is the angular displacement of N from $x'_I$, which lies in the $zz'$ plane and is normal to $z'$, while
$\theta_{II}'$ is the angular displacement of N from $x'_{II}$, which lies in the $xz'$ plane and is normal to $z'$.

The difference $\theta_{II}' - \theta_I' \equiv \alpha$ $\alpha$ is the phase difference between $E_{II}$ and $E_I$. It can be shown to be related to $\Phi_1$ and $\theta_1$ as follows:

$$\cos \alpha = \dfrac{\cos \phi_2 \cos \theta_1}{\sqrt{\cos^2 \phi_1 + \sin^2 \phi_1 \sin^2 \theta_1}} \quad (7A)$$

or $$\sin \theta_1 = \dfrac{\sin \alpha}{\sqrt{1 + \cos^2 \alpha \tan^2 \phi_1}} \quad (7B)$$

CASE III

Is defined as the case in which the magnetic field $B_{III}$ has a vertical component $(B_{III})_z$ and a horizontal component $(B_{III})_x$ $E_{III}$ is given by the sum of terms as in Case I and Case II
$E_{III} = nA\omega[(B_{III})_z \sin \Phi_1 \sin \theta_I' + (B_{III})_x \sqrt{1 - \sin^2 \Phi_1 \cos^2 \theta_1} \sin(\alpha + \theta_I')]$ \quad (8)

CASE IV

Is defined as the case in which the rotational axis of coil is vertical, $\Phi_1 = 0$, and by Equation (7A) or (7B) $\alpha = \theta_1$, with the result that Equation (8) reduces to
$E_{IV} = nA\omega(B_{IV})_x \sin(\alpha + \theta_I')$ and $\alpha = \theta_1$ \quad (9)

The azimuth angle of the borehole, $\theta_1$, is obtained by measuring the phase angle, $\alpha$, between the inclination coil signal, $E_{inc}$ (as in Case I) and the compass coil signal, $E_{com}$. In the case of the compass coil having its axis vertical (as in Case IV), the measured phase angle, $\alpha$, between $E_{com}$ and $E_{inc}$ is the desired angle $\theta_1$ directly. In the case of the compass coil having its axis tilted from the vertical and the coil being exposed to a magnetic field (e.g. the earth's) having both vertical and horizontal components (as in Case III), the measured phase angle, $\alpha$, between $E_{com}$ and $E_{inc}$ is not uniquely a function of the angle $\theta_1$, because of the fact that the vertical component of the magnetic field generates one component of $E_{com}$ (the first term in Equation (8)) which is in phase with $E_{inc}$, while the horizontal component generates another component of $E_{com}$ (the second term in Equation (8)) which is out of phase with $E_{inc}$ by the angle $\alpha$. In order to obtain a compass coil signal which is uniquely a function of $\theta_1$ one must eliminate the component of $E_{com}$ which is in phase with $E_{inc}$ (i.e. the first term in Equation (8)). This can be done in either of two ways: (1) eliminate the vertical component of the magnetic field which generates this undesired component of $E_{com}$ (i.e. operate in the manner of Case II); or (2) subtract off the undesired component of $E_{com}$ electrically, e.g. by subtracting the fraction $(B_{III})_z/(B_I)_z$ of $E_I$ from $E_{III}$, obtaining:

$E_{III} - [(B_{III})_z/(B_I)_z]E_I = nA\omega(B_{III})_x\sqrt{1 - \sin^2 \Phi_1 \cos^2 \theta_1} \sin(\alpha + \theta')$ \quad (10)

In either case the phase angle between $E_{inc}$ and the new $E_{com}$ so obtained will be the angle $\alpha$. This angle $\alpha$ together with the measured inclination angle $\theta_1$ gives the desired azimuth angle $\Phi_1$ by use of Equation (7B).

In summary, either one can use a vertical axis compass coil in a field that may have both vertical and horizontal components and obtain $\theta_1$ directly from the phase angle between $E_{com}$ and $E_{inc}$, or one can use a tilted axis compass coil and by eliminating either the vertical component of the magnetic field or the component of $E_{com}$ which is caused by it, obtain $\theta_1$ indirectly by computation with equation (7B).

From the foregoing it is readily seen that various embodiments of the logging instrument of this invention may be provided. One such embodiment is that illustrated in FIGS. 3, 4, and 5, wherein the inclination coil operates according to Case I and its signal is in accordance with Equation (5) thus:
$E_{inc} = (nA\omega)_{inc}(B_I)_z \sin \Phi_1 \sin \theta_I'$ \quad (E1a)
In this embodiment the compass coil operates according to Case IV in the earth's field and its signal is in accordance with Equation (9) thus:
$E_{com} = (nA\omega)_{com}(B_E)_x \sin(\theta_1 + \theta_I')$ \quad (E1b)
In this instance one can obtain the inclination angle $\Phi_1$ from the amplitude of $E_{inc}$ and the azimuth angle $\theta_1$ from the phase difference between $E_{inc}$ and $E_{com}$.

Figures 7, 8, 8A:
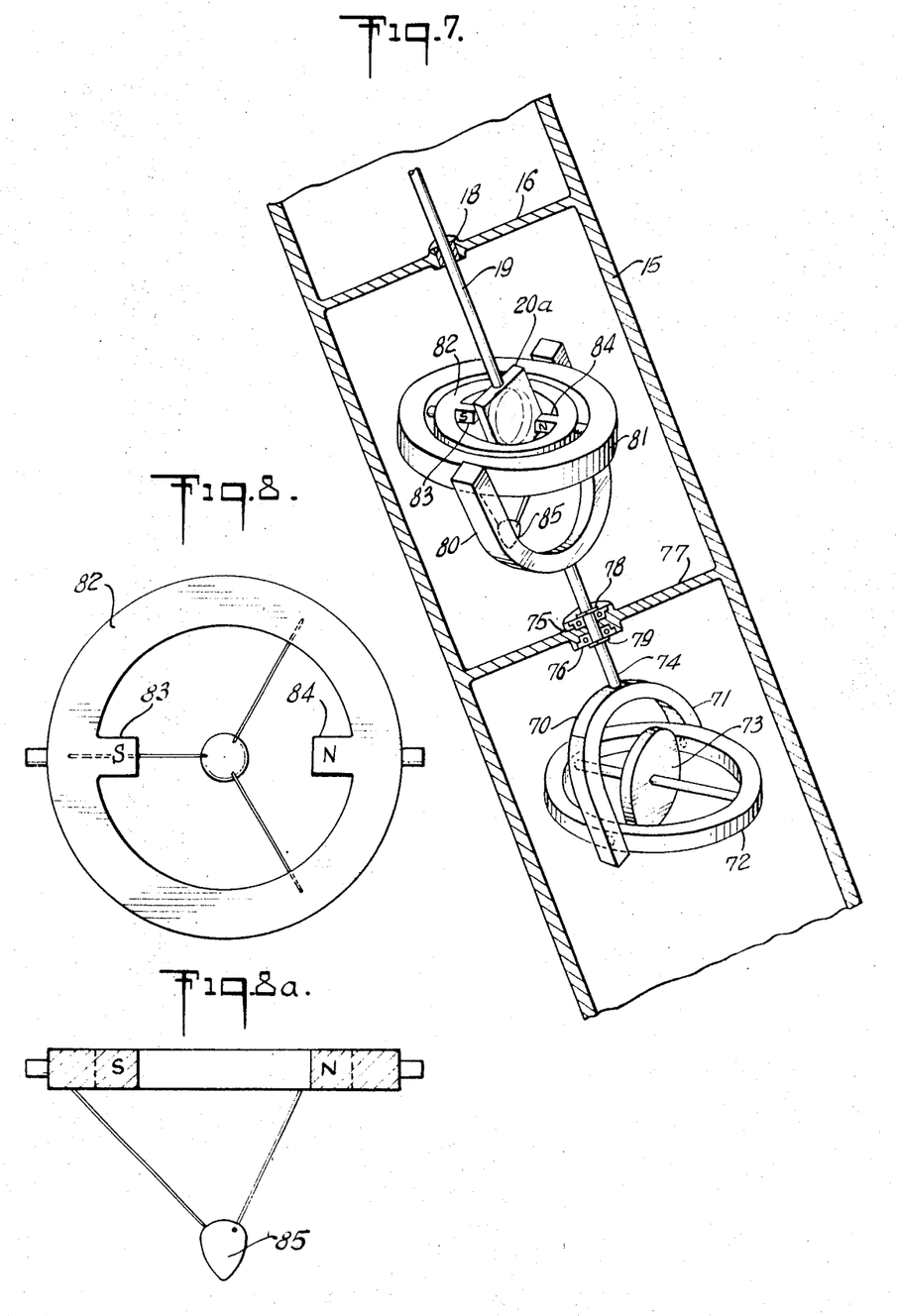
FIG. 7 is an oblique view of the lower portion of a modified version of the instrument of FIG. 3 illustrating features of an embodiment including a gyrocompass for providing a horizontal magnetic field of known azimuth direction intersecting the compass coil.
FIGS. 8 and 8a are respectively a plan view and a sectional elevation illustrating in further detail the magnetic field producing means of the embodiment of FIG. 7.

Referring now to FIG. 7 which is an oblique view of the lower portion of a modified version of the instrument of FIG. 3 illustrating features of an embodiment, including a gyrocompass, for providing a horizontal magnetic field of known azimuth direction intersecting the compass coil, the upper portion of the instrument is not shown and is as described above in reference to FIG. 3. Hence, the inclination coil operates as in Case I above and its signal is in accordance with the aforementioned equation (E1a). The compass coil illustrated in FIG. 7 rotates at the same rate about the same inclined axis as the inclination coil but is exposed to a horizontal magnetic field of predetermined azimuth direction. Hence, the compass coil operates as in Case II and its signal is in accordance with Equation (6) thus:

$$E_{com} = (nA\omega)_{com}(B_E)_x \sqrt{1 - \sin^2\Phi_1 \cos^2\theta_1} \sin(\alpha + \theta_1') \quad (E2b)$$

In this embodiment the inclination angle $\Phi_1$ is obtained directly from the amplitude of the inclination coil signal, and the azimuth angle $\theta_1$ is obtained by measuring the phase difference $\alpha$ between the inclination coil and compass coil signals and solving Equation (7b) for $\theta_1$ in terms of the measured $\Phi_1$ and $\alpha$. This solution may be performed by use of the analog computing apparatus illustrated in FIG. 11.

The embodiment of FIG. 7 provides a means for generating within the direction logging instrument a reference magnetic field for the compass coil, to replace the earth's magnetic field in situations where it is desirable to do so, that is, for example, where the well is cased with steel pipe such that the earth's magnetic field does not penetrate within the casing and therefore cannot be sensed by the compass coil, or where the direction of the earth's magnetic field varies substantially over the borehole length with the result that it cannot be relied upon for a consistent reference direction.

Specifically, in FIG. 7 a gyrocompass 70 is shown diagrammatically including a yoke 71, a gimbal ring 72 pivotally mounted within the yoke, and an inertia wheel 73 rotatably mounted to the gimbal ring 72. The inertia wheel 73 is rotated by a suitable drive means, not shown, incorporated in the gimbal ring 72, which rotates the inertia wheel 73 at a suitable gyroscopic angular velocity in accordance with the present art. Fixed to the upper portion of the yoke 71 is a shaft 74 which passes upwardly through bearings 75 and 76 which are in turn mounted spaced apart and coincident with the axis of the lower instrument case 15 and supported therein in a flange 77. The shaft 74 is axially positioned with respect to the bearings 75 and 76 by retaining rings 78 and 79. Fixed to the upper end of the shaft 74 is an upper yoke 80 within the arms of which is pivotally mounted an outer gimbal ring 81. An inner gimbal ring 82 is pivotally mounted within the outer gimbal ring 81 in a manner such that its pivotal axis is deposed at a right angle to the pivotal axis of the outer gimbal ring 81 thereby providing the inner gimbal ring 82 with complete pivotal freedom. A plumb bob 85 is suspended from the inner gimbal ring 82 and maintains it in a constant horizontal orientation. The inner gimbal ring 82 is made as a permanent ring magnet and incorporates a pair of diametrically opposed pole pieces 83 and 84 on the inner surface thereof which provide a horizontal magnetic field in the space within the inner gimbal ring. The compass coil 20a rotates in this space. The upper portion of the compass coil 20a is fixed to an extension of the shaft 19 which passes through the bearing 18 and continues upwardly where it is connected with the inclination coil 10 and is rotated by the motor 11 as discussed in reference to FIG. 3. In this embodiment the lower instrument case 15 may be optionally made of either a magnetic or a nonmagnetic material since the magnetic field strength provided by the inner gimbal ring 82 far exceeds the strength of the earth's magnetic field.

The gyrocompass 70 is aligned with some reference direction, e.g. the north-south direction, before the instrument is lowered into the borehole. It thereafter maintains this alignment throughout the borehole so that the magnetic flux lines between the pole pieces 83 and 84 maintain the desired azimuth reference direction and horizontal orientation.

FIGS. 8 and 8a illustrate in greater pictorial detail the construction of the inner gimbal ring 82 assembled with the plumb bob 85.

Figure 9:
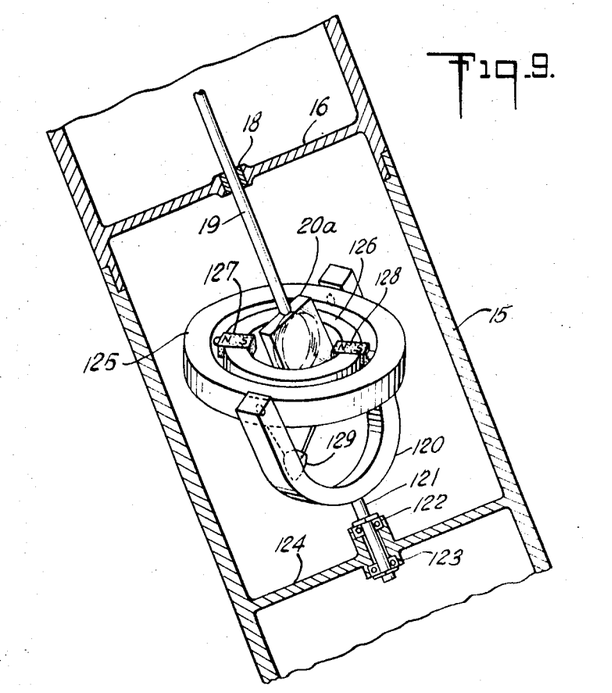
FIG. 9 is an oblique view of the lower portion of another modified version of the instrument of FIG. 3 illustrating features of another embodiment for providing a horizontal magnetic field of known azimuth direction intersecting the compass coil.

Referring now to FIG. 9 which is an oblique view of the lower portion of another modified version of the instrument of FIG. 3 illustrating features of another embodiment for providing a horizontal magnetic field of known azimuth direction intersecting the compass coil, the inclination and compass coil signals of this embodiment are related to the inclination and azimuth of the borehole in the same manner as are the signals of the embodiment of FIG. 7. Hence, the inclination and compass coil signals are respectively in accordance with Equations (E1a) and (E2b). The yoke 120 is provided axially disposed and pivotally mounted within the lower instrument case 15. A shaft 121 extends downwardly from the yoke 120 and is mounted in bearings 122 and 123 which are in turn mounted in a flange 124 extending from the lower instrument case 15. Pivotally mounted within the arms of the yoke 120 is an outer gimbal ring 125 the pivotal axis of which is disposed approximately at a right angle to the pivotal axis of the yoke 120. Pivotally mounted within the outer gimbal ring 125 is an inner gimbal ring 126 the pivotal axis of which is mutually perpendicular to the pivotal axis between the outer gimbal ring 125 and the yoke 120. Hence, the inner gimbal ring 126 is pivotally free to assume any position. The inner gimbal ring 126 is made of a nonmagnetic material, and integrally mounted thereon are a pair of diametrically opposed bar magnets 127 and 128, mounted with opposite poles facing each other across the inner space of the inner gimbal ring 126. The outer gimbal ring 125 and the lower instrument case 15 are made of a nonmagnetic material permitting penetration of the earth's magnetic field into the region occupied by the inner gimbal ring 126. The interaction of the earth's magnetic field with the magnets 127 and 128 causes the inner gimbal ring 126 in combination with the yoke 120 to behave as a compass whereby the inner gimbal ring 126 is maintained in a constant azimuth orientation. Hence, the magnetic field between the opposed poles in the inner region of the inner gimbal ring 126 is maintained in a constant azimuth orientation. Also, the inner gimbal ring 126 is maintained in a horizontal position by a plumb bob 129 suspended from the lower surface thereof so that the latter mentioned magnetic field is also maintained in a horizontal orientation. The compass coil 20a is rotated within the inner poles of the magnets 127, 128 and is subjected to this magnetic field. The upper portion of the compass coil 20a is fixed to an extension of the shaft 19 which passes through the bearing 18 and continues upwardly where it is connected with the inclination coil 10 and is rotated by the motor 11 as discussed in reference to FIG. 3.

Figure 10:
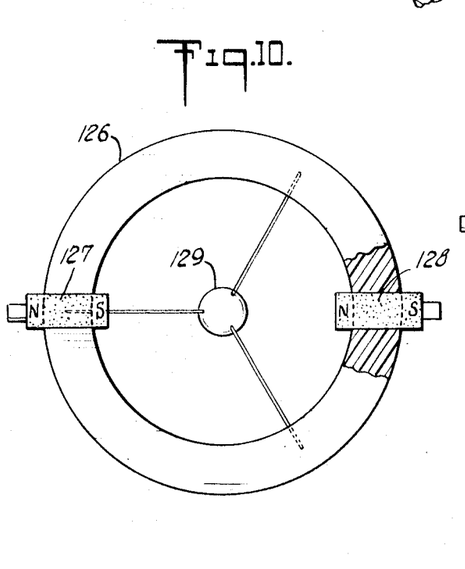
FIGS. 10 and 10a are respectively a plan view and a sectional elevation illustrating in further detail the magnetic field producing means of the embodiment of FIG. 9.
Figure 10A:
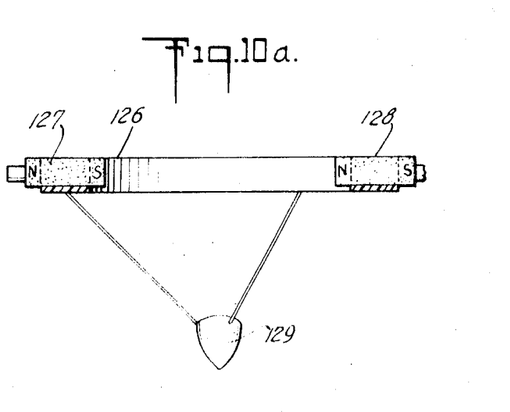

FIGS. 10 and 10a illustrate in greater detail the construction of the inner gimbal ring 126 including the bar magnets 127, 128 and the plumb bob 129.

It is to be appreciated by one skilled in the art that various other embodiments of the logging instrument of this invention are possible by selecting the inclination and compass coil configurations from any of the aforementioned Cases I through IV.

Figure 1:
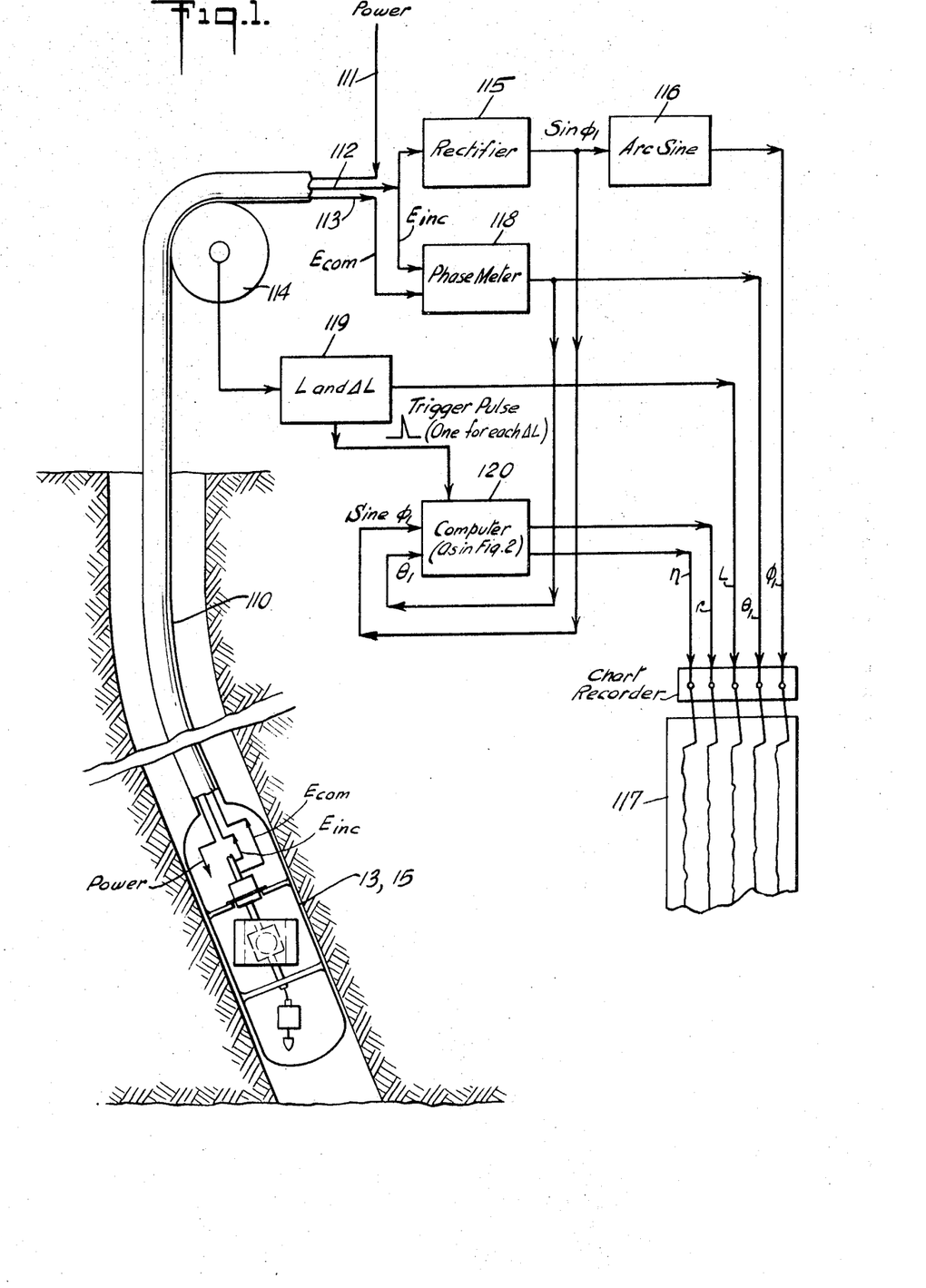
FIG. 1 is a vertical sectional view of the earth traversed by a borehole containing an embodiment of the instrument of the invention and illustrating in block diagram form a system employing features of the invention for determining the position of the borehole at any depth, and its inclination and azimuth angles.
Figure 11:
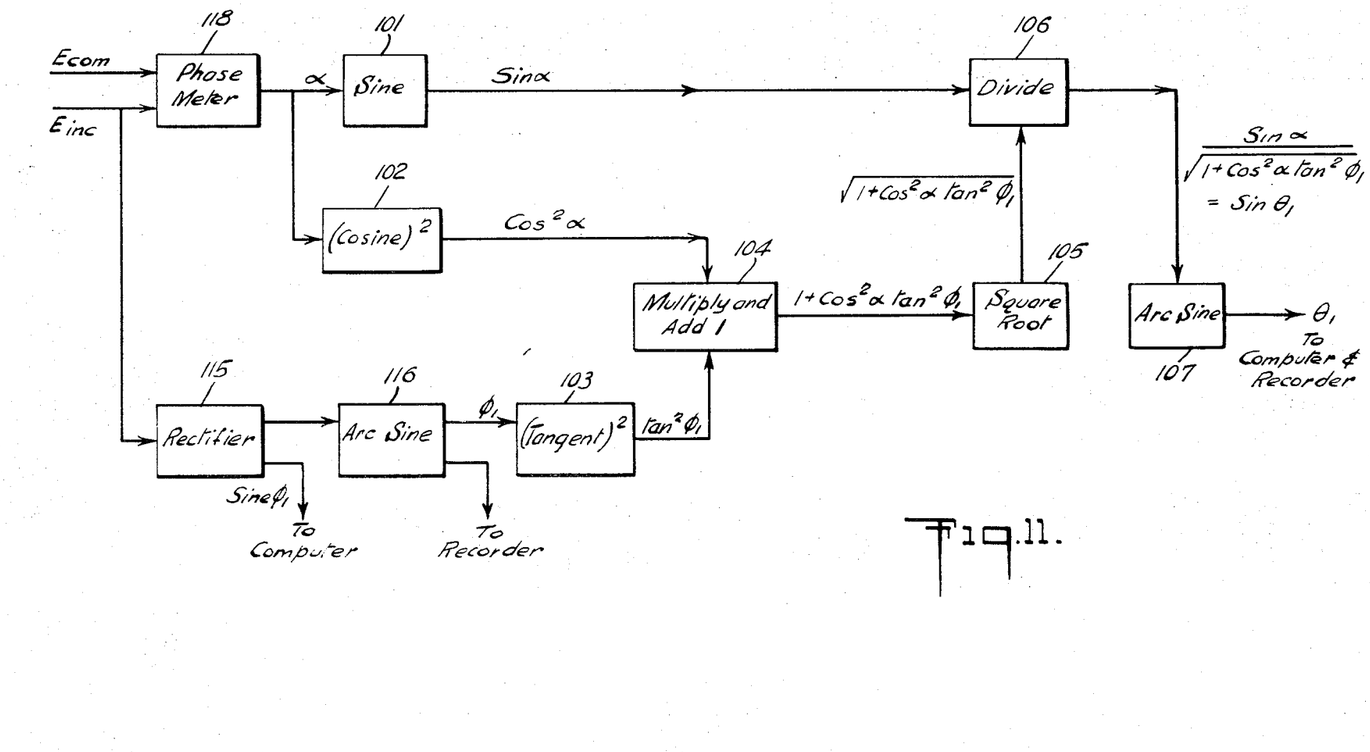
FIG. 11 is a schematic block diagram illustrating an embodiment of an analog computer for developing a signal corresponding to the azimuth angle of the borehole, which may be used in conjunction with the embodiments of the logging instrument illustrated in FIGS. 7 and 9.

Referring now to FIG. 11 which is a schematic block diagram illustrating an embodiment of an analog computer for developing a signal corresponding to the azimuth angle of the borehole which may be used in conjunction with the embodiments of the logging instrument illustrated in FIGS. 7 and 9, the signals $E_{com}$ and $E_{inc}$ from the logging instrument are transmitted to a phase meter 118 which measures the phase angle between the signals and provides a DC output signal corresponding to the phase angle $\alpha$. The signal from the inclination coil of the instrument is also transmitted to a rectifier 115 which converts it to a direct current signal which is a measure of $\sin \Phi_1$. This signal is in turn transmitted to the computer 120 of FIG. 1 for computation of the borehole position and also to an arc sine operator 116 in FIG. 11 which provides an output signal proportional to $\Phi_1$, the borehole inclination angle. This signal may be transmitted to a chart recorder as illustrated in FIG. 1 where it may be read by a human observer. Since the compass coil of the logging instruments of FIGS. 7 and 9 operates in accordance with case II the phase angle between the signals $E_{com}$ and $E_{inc}$ must be corrected in accordance with Equation (7B) in order to obtain the borehole azimuth angle. The output signal $\alpha$ of the phase meter 118 is transmitted to a sine operator 101 which provides an output signal corresponding to sin $\alpha$. The $\alpha$ signal is also transmitted to a (cosine)² operator 102 which provides an output signal corresponding to $\cos^2 \alpha$. The signal proportional to $\Phi_1$ from the arc sine operator 116 is also transmitted to a (tangent)² operator 103 which provides an output signal corresponding to $\tan^2 \Phi_1$ which is in turn transmitted to a multiplication operator 104. The $\cos^2 \alpha$ signal from the (cosine)² operator 102 is also transmitted to the multiplication operator 104 which multiplies its two input signals and adds unity. The output signal from the multiplication operator 104 hence corresponds to the value:

$1 + \cos^2 \alpha \tan^2 \Phi_1$

This signal is in turn transmitted to a square root operator 105 which computes the square root of this value and transmits a signal corresponding thereto to a division operator 106. The signal corresponding to sin $\alpha$ from the sine operator 101 is also transmitted to the division operator 106 which divides the former of its input signals into the latter. The output of the division operator 106 therefore corresponds to sin $\theta_1$ in accordance with equation (7B). This signal is transmitted to an arc sine operator 107 which provides an output signal corresponding to $\theta_1$ the borehole azimuth angle. The $\theta_1$ signal may then be transmitted to the computer illustrated in FIGS. 1 and 2 for computation of the borehole position, and it may also be transmitted to a chart recorder where it may be observed.

Figure 12:
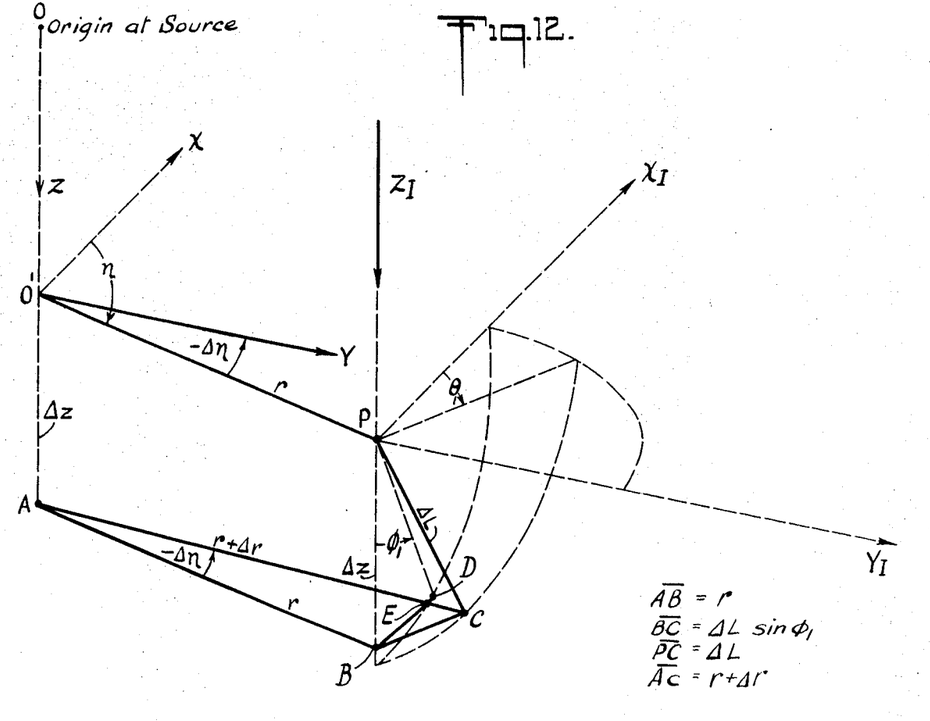
FIG. 12 is an oblique view of a three-dimensional coordinate system and trigonometric construction useful in practicing the method of the invention for determining the position of the borehole at any depth.
Figure 13:
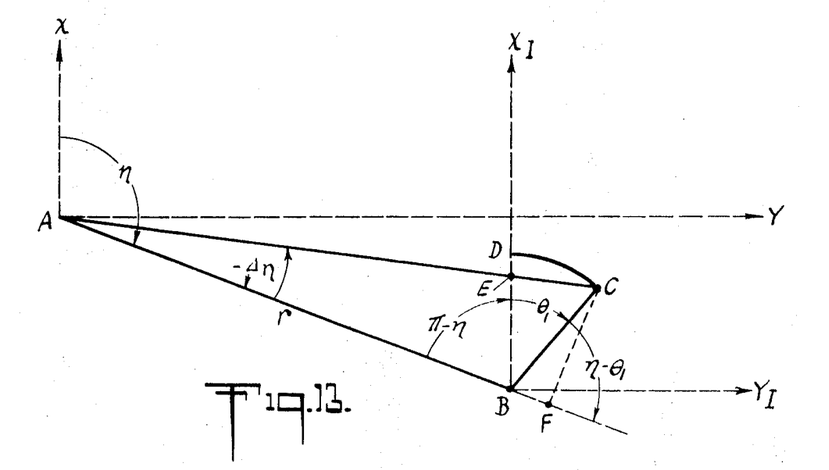
FIG. 13 is a plan view of a portion of FIG. 12.

Referring now to FIGS. 12 and 13; FIG. 12 provides an oblique view of a three dimensional coordinate system useful in practicing the method of the invention for determining the position of the borehole at any depth, and FIG. 13 is a two dimensional view, in the xy plane, of a portion of FIG. 12. The following glossary of terms applies to these FIGS. and to the descriptions hereinafter included:

$\Phi_1$ = the borehole inclination angle.
$\theta_1$ = the borehole azimuth angle measured from a reference axis $X_I$,
$x,y,z$ = the respective axes of a Cartesian coordinate system having its origin on the axis of the borehole at the earth's surface with z axis vertical; the x axis being preferably in the direction of either magnetic north or geographic north,
$x_I, y_I, z_I$ = the respective axes of a translated Cartesian coordinate system with axes parallel to those of the $x,y,z$ system, with origin at an arbitrary point P anywhere along the depth of the borehole,
$r$ = the distance in a cylindrical coordinate system measured from the z axis to any point P along the borehole axis,
$\eta$ = the angular displacement (in the cylindrical coordinate system) of any point P along the borehole axis in reference to the axis $x$ of known direction,
$L$ = the depth to any point along the path of the borehole,
$\Delta L$ = the incremental change of L from one point P to another point C along the borehole,
$\Delta r$ = the incremental change of r between the same points corresponding to $\Delta L$,
$\Delta \eta$ = the incremental change of $\eta$ between the same points corresponding to $\Delta L$.

In order to determine the location of the borehole at any depth it is necessary to perform an integration, or summing up, of the effect of all of the instantaneous values of inclination and of azimuth angle over the entire borehole path from the earth's surface to the given depth L. The coordinate system, $x,y,z$ has its origin at the center of the borehole at the earth's surface, with the z axis vertical. At any depth z, the center of the borehole has wandered to the point P indicated by the cylindrical coordinates z, r and $\eta$. Assume that at this point the instrument of the invention measures the inclination angle to be $\Phi_1$ and the azimuth angle to be $\theta_1$. The next increment of depth $\Delta z$ is reflected in a corresponding increment of length along the borehole $\alpha L$ to the terminal point thereof C. C is at a distance $r+\Delta r$ from the z axis, and at an angle $\eta+\Delta\eta$ from the x axis measured in a horizontal plane, that is, measured in a plane perpendicular to the z axis. The desired result is to obtain the location of the borehole, that is, of any point P along its length, expressed in terms of r and $\eta$ for any known length L along the borehole path, having continually measured $\Phi_1$ and $\theta_1$ for each $\Delta L$ along the borehole path to the point P. Applying the law of cosines to the triangle ABC of FIG. 13 we have:

$\overline{AC}^2 = \overline{AB}^2 + \overline{BC}^2 bq\, l\, 2\overline{AB}\cdot\overline{BC}\cos(\pi-\eta+\theta_1)$ (11)

also:
$$\left.\begin{array}{l}\overline{AB}=r \\ \overline{BC}=\Delta L \sin \Phi_1 \\ \overline{AC}=r+\Delta r\end{array}\right\} \quad (12)$$

By substituting the equations (12) in equation (11) and simplifying we have:
$\Delta r = \Delta L \sin \Phi_1 \cos(\theta_1 - \eta)$
and:

$r = \sum_{L=0}^{l} \Delta L \sin \Phi_1 \cos(\theta_1 - \eta)$ (13)

Applying the law of sines to the triangle ABC of FIG. 13 we have:

$$\frac{\sin(-\Delta\eta)}{\overline{BC}} = \frac{\sin(\pi-\eta+\theta_1)}{\overline{AC}} \quad (14)$$

By substituting the appropriate expressions of equations (12) in equation (14) and simplifying we have:

$$\Delta\eta = \arc\sin\left[-\frac{\Delta L \sin \phi_1 \sin(\eta-\theta_1)}{r+\Delta r}\right]$$

and for small $\Delta\eta$'s:

$$\eta \simeq (\theta_1)_o + \sum_{L=0}^{L} \frac{\Delta L \sin \phi_1 \sin(\theta_1-\eta)}{r} \quad (15)$$

where:
$(\theta_1)_o$ = the value of the angle $\theta_1$ when r first equals or exceeds $\epsilon$ the minimum detectable amount of r.

Equations (13) and (15) above provide the cylindrical coordinates, r and $\eta$, of the location of the borehole at any depth L, measured along its path, after any sequence of values of inclination angle and azimuth angle have occurred and which have been continually measured in reference to every increment of length, $\Delta L$, along the borehole. It will now be shown that it is possible to obtain the values of the coordinates of the location of the borehole by computation, which may be carried out simultaneously with the running of the directional log, or the data may be stored and the computation carried out subsequently. In either instance the computational steps may be performed with the aid of equipment lowered into the borehole in conjunction with the logging instrument, or the steps may be performed at any time on the earth's surface.

Referring now to FIG. 1 which illustrates a vertical section of the earth traversed by a borehole containing the instrument of the invention and illustrates in block form a system employing features of the invention for determining the position of the borehole at any depth, and its inclination and azimuth angles, the logging instrument 13, 15 discussed in reference to FIGS. 3, 4, and 5 is illustrated in an inclined portion of the borehole. A logging cable 110 is provided for raising and lowering the logging instrument through the borehole. The logging cable 110 contains three conductors 111, 112, and 113, and passes over a conventional wheel or sheave 114, which is mounted for rotation. The conductor 111 carries electrical power down to the instrument. The conductor 112 carries the alternating signal $E_{inc}$ from the inclination coil of the instrument, and the conductor 113 carries the alternating signal $E_{com}$ from the compass coil of the logging instrument. The inclination coil signal is transmitted to a rectifier 115 which converts it to a direct current signal which is a measure of $\sin \Phi_1$. This signal is in turn transmitted to an arc sine operator 116 which provides an output signal which is a measure of the angle $\Phi_1$ itself. This signal is in turn recorded by a chart recorder 117 as shown. The inclination coil signal in the conductor 112 is also transmitted to a phase meter 118 to which is also transmitted the compass coil signal in the conductor 113. The phase meter 118, when used with the instrument as embodied in FIG. 3, measures the phase difference $\alpha$ between its alternating signal inputs and provides a direct current output signal which is a measure of the azimuth angle $\theta_1$. This azimuth angle signal is transmitted to the chart recorder 117 where it is recorded. A suitable phase meter which may be used is that manufactured by Ad-Yu Electronics Inc., Passaic, N.J., under the trade designation: Type 405L Precision Phase Meter. A length measuring and pulse generating unit 119 is provided which is mechanically coupled with the sheave 114 and includes means for measuring each increment of cable length such as, for example, 1 foot, passing over the sheave 114 as the logging instrument is raised or lowered, and issues a trigger pulse for each such length increment. The length measuring unit 119 also includes means for providing a continuous electrical output signal corresponding to the cable length. This length signal is transmitted to the recorder 117 where it is recorded. The trigger pulse representative of the passage of incremental length segments of the logging cable are transmitted to a computer 120. Also transmitted to the computer 120 are the direct current signals from the rectifier 115 and from the phase meter 118 representative respectively, of $\sin\Phi_1$ and of the azimuth angle $\theta_1$. The computer 120 is as illustrated in FIG. 2; it solves equations (13) and (15) for $r$ and $\eta$, and provides corresponding output signals which are transmitted to the chart recorder 117 where they are recorded.

In summary, it is seen that five signals are concurrently recorded by the chart recorder 117, to wit: $\Phi_1$, $\theta_1$, L, $r$, and $\eta$. The first three signals $\Phi_1$, $\theta_1$, and L, provide the inclination and azimuth angles of the borehole at any depth L therein at which the logging instrument is placed. The last three signals L, $r$, and $\eta$, provide the location of the borehole at any depth L, in terms of a radius coordinate $r$ and an angle coordinate $\eta$.

It is to be noted that the quantity $\eta$ appears in the equation (13) for $r$ and that both the quantities $\eta$ and $r$ appear in the equation (15) for $\eta$. As a consequence the equations (13) and (15) must be solved by trial and error using successively determined values of $\eta$ and $r$. If the equations are solved by digital electronic techniques this problem can be overcome readily, without introducing any significant error, since such successive calculations may be preprogrammed and rapidly performed. In this method the first value of $r$ is computed in accordance with equation (13) using for the value of $\eta$ the first perceptible value of $\theta_1$, measured in the course of the log. This solution provides a first value of $r$ which together with the assumed value of $\eta$, that is, the first perceptible value of $\theta_1$, may be used to compute a first value of $\eta$ in accordance with equation (15). Subsequent computations are then made using the most recently computed values of $r$ and $\eta$; that is, the $j$th computation of $r$ and $\eta$ uses the $(j-1)$th computed values of $r$ and $\eta$ in the equations. It can be seen that following several successive solutions for $r$ and $\eta$, the equations (13) and (15) subsequently provide accurate summations determining the values of $r$ and $\eta$. It should be noted that erroneous results may be obtained from these computations in the following situation. Assume that the borehole has at some depth departed from true vertical and wandered out to a position having an $r$ value of six feet at an $\eta$ value of 90° from the direction of north and that subsequently at a different depth it wanders back to an $r$ value which is zero, or sufficiently close to zero that its value is beyond the resolution capability of the logging apparatus, and that in reference to both and to intermediate depths, the borehole has maintained an $\eta$ value of 90°. Let us assume that subsequently, at still another depth, the borehole wanders off again at an azimuth angle of 180°. If in this circumstance equation (15) is solved continuously for all of these depths the computer would retain the value of 90° in the total or integrated value of $\eta$ for the last mentioned depth notwithstanding that $r$ had become zero at a previous depth. This problem may be avoided by starting the computation over again each time $r$ approaches a predetermined value close to the resolution capability of the logging apparatus by using in equation (15) the last determined value of $\eta$ for the angle $(\theta_1)_0$ as defined in equation (15). If digital computing elements are utilized in the computer 120, this problem may be readily solved by programming the computer to start the solution of equations (13) and (15) over again, to reset $r$ to zero, and to carry over to $(\theta_1)_0$ the latest computed value of $\eta$, when $r$ decreases to the predetermined value $\epsilon$.

Figure 2:
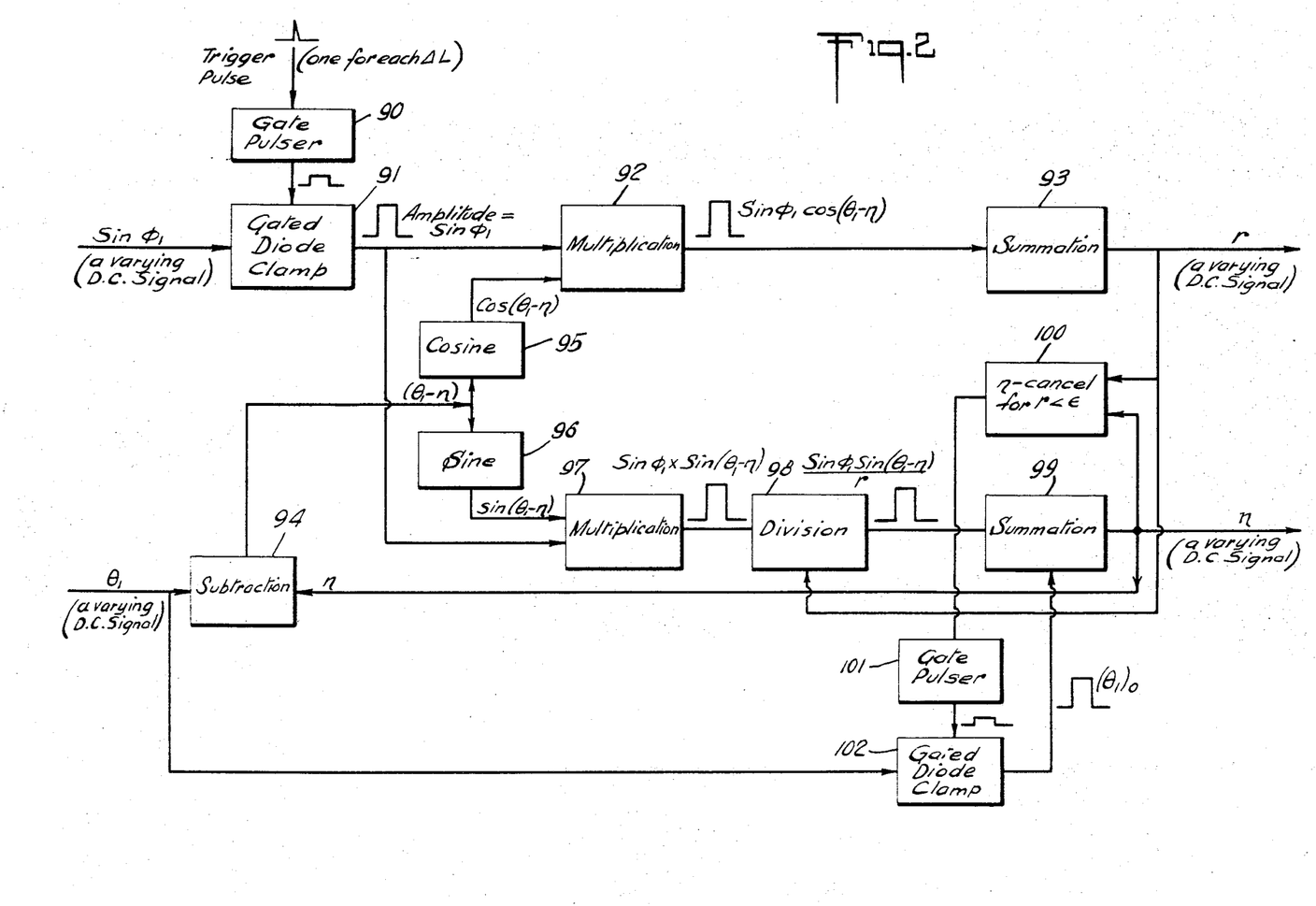
FIG. 2 is a schematic block diagram illustrating an embodiment of an analog computing system which may be used as the computer shown in FIG. 1.

Referring now to FIG. 2, which illustrates an analog computing system which may be used as the computer shown in FIG. 1, each time an incremental length $\Delta L$ of the logging cable 110 is reeled out, or in, the trigger pulse transmitted to the computer by the length unit 119 is received by a gate pulser 90, which provides a gated pulse of fixed duration in response to each trigger pulse representing each $\Delta L$ movement of the logging instrument through the borehole. A gated pulse is transmitted to a gated diode clamp 91 to which is also transmitted the DC signal proportional to $\sin \Phi_1$ from the rectifier 115 of FIG. 1. The gated diode clamp 91 operates as an electronic switch and in response to each input pulse generates an output pulse the duration of which is equal to the duration of its input pulse and the amplitude of which is proportional to $\sin \Phi_1$. This signal is transmitted to a multiplication operator 92 to which is also transmitted a DC signal proportional to the cosine of $(\theta_1-\eta)$ which is obtained from a later described portion of the computer. The multiplication operator 92 multiplies its two input signals and provides a pulse output signal, the duration of each pulse being equal to the duration of each input pulse thereto from the gated diode clamp 91 and the amplitude of each pulse being equal to the product of $\sin \Phi_1$ and cosine $(\theta_1-\eta)$. It can be seen from equation (13) that each of these pulse signals corresponds to each of the $\Delta r$'s which when summed provides the total $r$ or horizontal drift of the borehole from its starting point. This signal is transmitted to a summation device 93, which provides an output signal corresponding to the accumulated sum of the amplitudes of its input pulses. The output signal from the summation device 93 therefore corresponds to $r$, the total horizontal drift of the borehole from its starting point on the earth's surface. It is to be understood that the units of $r$, thus calculated, are in the same units are those of L. Thus if $\Delta L$ is 1 foot, the units of the computed value of $r$ is in feet.

The DC signal representing $\theta_1$ the azimuth angle of the borehole is transmitted from the phase meter 118 shown in FIGS. 1 and 11 to a subtraction operator 94 shown in FIG. 2. Also transmitted to the subtraction operator 94 is a feedback signal from the output section of the computer corresponding to $\eta$. The subtraction operator 94 subtracts the former signal from the latter and provides an output DC signal proportional to $(\theta_1-\eta)$. This signal is transmitted to a cosine operator 95 and to a sine operator 96. The former provides a signal corresponding to cosine $(\theta_1-\eta)$ and transmits it to the multiplication operator 92 for use thereof in the computation for $r$ as described above. The sine operator 96 provides an output signal corresponding to $\sin (\theta_1-\eta)$ and transmits the signal to a multiplication operator 97. Also transmitted to the multiplication operator 97 is the pulse signal from the gated diode clamp 91 corresponding to $\sin \Phi_1$. The multiplication operator 97 multiplies its input signals and provides a pulsed output signal, the pulse duration of which is equal to the duration of the pulse provided by the gated diode clamp 91, and the amplitude of which equals the product of $\sin \Phi_1$ and $\sin (\theta_1-\eta)$. This signal is transmitted to a division operator 98, to which is also transmitted the DC signal proportional to $r$ from the summation device 93. The division operator 98 divides the former input signal by the latter and provides a pulsed output signal, the duration of which is equal to the duration of its pulsed input signal and the amplitude of which is equal to the quotient of its input signals. It can be seen from equation (15) that the amplitude of each output pulse of the division operator 98 is proportional to each increment of angle $\eta$. This signal is transmitted to a summation device 99 which continually adds its input pulses and provides a DC output signal corresponding to $\eta$. The output of the summation device 99 corresponds to $\eta$ only if the proper constant of integration is also summed in the summation device along with its input pulses. This integration constant is $(\theta_1)_0$, which is the value $\theta_1$ has when $r$ first equals or exceeds $\epsilon$ the predetermined reset value of $r$.

To develop the $(\theta_1)_0$ signal both the $r$ and $\eta$ signals are transmitted to an $\eta$-cancel operator 100, which shorts the $\eta$ signal to ground at all times except when $r$ is greater than $\epsilon$. The cancel operator 100 may include an electronic switch such as a diode clamp which connects the $\eta$ lead to ground at all times except when the $r$ signal is greater than the predetermined reset value which is set into a control element by a discriminator setting. In addition to the discriminator the control element may include a gating element which supplies a control signal to the aforementioned electronic switch whereby the switch is open at all times when $r$ equals or exceeds the value $\epsilon$ set into the discriminator and permits the $\eta$ signal to pass through the cancel operator 100 uncancelled. When $r$ becomes less than the discriminator setting the electronic switch closes and cancels the $\eta$ signal to ground thereby resetting the summation device 99 by eliminating therefrom the entire accumulated value of $\eta$. Following each occasion when the $\eta$ signal is cancelled and then when $r$ grows again to a point where it equals or exceeds $\epsilon$, the cancel operator 100 applies a single trigger pulse to a gate pulser 101 which in response applies a single pulse to a gated diode clamp 102. The duration of the latter pulse is equal to the duration of the pulses generated by the gate pulser 90 representing $\Delta L$. Also transmitted to the gated diode clamp 102 is the DC signal representing $\theta_1$ from the phase meter 118 shown in FIGS. 2 and 11. The gated diode clamp 102 permits $\theta_1$ to pass as a pulse the amplitude of which is equal to the $\theta_1$ signal and the duration of which is equal to the duration of its input pulse. This pulse signal represents the value $(\theta_1)_0$ in equation (15) and is transmitted from the gated diode clamp 102 to the summation device 99 where it is included in the summed output thereof representing $\eta$. It should be noted that the gate pulser 101 applies its pulse of predetermined duration to the gated diode clamp 102 only once for each occasion when $\eta$ is cancelled and restored. Therefore, only one $(\theta_1)_0$ pulse is passed by the gated diode clamp 102 for each sequence of summation commencing with the restoration of $r$ to a value which equals or exceeds its minimum predetermined reset value $\epsilon$. From the foregoing we see that the outputs of the summation devices 93 and 99 represent respectively, $r$ and $\eta$, in accordance with equations (13) and (15).

It should be noted that the computer of FIG. 2 may be used in conjunction with any of the embodiments of the logging instrument herein referred to once the inclination and compass coil signals are corrected to reflect the actual values of the inclination and azimuth angles in accordance with the equations discussed in reference to FIG. 6.

It is to be appreciated by one skilled in the art that while analog computation methods have been disclosed the computations may also be performed quite advantageously by digital computation techniques either concurrently with the taking of the directional logging data or subsequently. It is also to be appreciated by one skilled in the art that some or all of the electronic computing equipment may be incorporated within the logging instrument housing which is lowered into the borehole. In this instance the signals received on the earth's surface would require less manipulations.

While the invention has been described with a certain degree of particularity, it can, nevertheless be seen by the examples hereinabove set forth that many modifications and variations of the invention may be made without departing from the spirit and scope thereof.

I claim:

1. An apparatus for directional logging of a borehole at any depth by obtaining signals representative of the inclination and azimuth angles of said borehole at said depth comprising:
   a. a first induction coil;
   b. first coil rotating means for rotating said first induction coil about an axis substantially parallel to the longitudinal axis of said borehole;
   c. means for generating a first magnetic field in the vertical direction, said field intersecting said first coil when rotating thereby generating in said first coil a first alternating electrical signal representative of the angle between the axis of rotation of said coil and said magnetic field whereby said first signal depends upon said angle so that it is representative of the inclination angle of said borehole;
   d. a second induction coil; and
   e. second coil rotating means for rotating said second induction coil at substantially the same rate as said first coil while said second coil is being subjected to a magnetic field with a horizontal component of a predetermined azimuth direction which intersects said second coil when rotating, thereby generating in said second coil a second alternating electrical signal the phase angle of which with respect to said first signal is representative of the azimuth angle of said borehole with respect to said magnetic field component of predetermined azimuth direction, the inclination and azimuth angles of said borehole being determinable from said first and second signals.

2. The apparatus of claim 1 wherein said second coil rotating means (e) comprises:
   e. means for rotating said second induction coil at substantially the same rate as said first coil while subjecting said second coil to the earth's magnetic field, thereby generating in said second coil, a second alternating electrical signal the phase angle of which with respect to said first signal is representative of the azimuth direction of said borehole with respect to the earth's magnetic field, the inclination and azimuth angles of said borehole being determinable from said first and second signals.

3. The apparatus of claim 1 wherein said second coil rotating means (e) comprises:
   ea. means for rotating said second induction coil at substantially the same rate as said first coil; and
   eb. magnetic field producing means for generating a second magnetic field with a horizontal component of a predetermined azimuth direction intersecting said second coil thereby generating in said second coil, a second alternating electrical signal the phase angle of which with respect to said first signal is representative of the azimuth direction of said borehole inclination with respect to said magnetic field component of predetermined azimuth direction the inclination and azimuth angles of said borehole being determinable from said first and second signals.

4. The apparatus of claim 1 wherein said first coil rotating means (b) comprises:
   ba. a first housing having a longitudinal axis of rotating for the rotation thereabout of said first coil with respect to said housing;
   said housing being designed to provide at least a substantially parallel disposition of said axis of rotation of said first coil with respect to the longitudinal axis of said borehole where said housing is placed in said borehole; and
   bb. drive means mounted in said housing and coupled with said first coil for rotation of said first coil about said axis.

5. The apparatus of claim 4 wherein said first housing incorporates first and second flanges intersecting said axis and transversely spaced apart with respect to said axis, wherein said first coil is rotatably mounted to said first and second flanges coincident with said axis for rotation thereabout in the space between said first and second flanges, wherein said first housing between said first and second flanges is made of a magnetically permeable material thereby shielding said first coil from the earth's magnetic field, and wherein said drive means (bb) includes a synchronous motor coupled with said first coil for uniform rotation of said first coil about said axis.

6. The apparatus of claim 4 wherein said means (c) for generating a first magnetic field comprises; a Helmholtz coil magnetically coupled with said first induction coil, said Helmholtz coil having a magnetic axis, and means for freely suspending said Helmholtz coil in said first housing enabling said magnetic axis thereof to assume a vertical position when said first housing is placed in said borehole whereby the vertical component of the magnetic flux provided by said Helmholtz coil generates in said first induction coil a first alternating electrical signal representative of the inclination angle of said borehole.

7. The apparatus of claim 6 wherein said Helmholtz coil comprises: a pair of electrical coils each of which contains a plurality of windings of electrical wire, and a cylindrical weight, said coils and said weight being integrally cast with a suitable potting material in the form of a hollow cylinder, said coils being cast in said cylinder axially spaced apart and said weight being axially disposed at the lower end of said cylinder, whereby said pair of electrical coils when energized by direct electrical current provide a magnetic field having flux lines of a substantially uniform axial direction in said central opening of said cylinder between said electrical coils therein, the central opening of said hollow cylinder being sufficiently large to permit said first induction coil to freely rotate therewithin when said cylinder is freely suspended in said housing to assume a vertical position, wherein said means for freely suspending said Helmholtz cylinder includes gimballed mounting means for mounting said cylinder in said first housing permitting the magnetic axis of said cylinder to assume a vertical position under the influence of said weight in said Helmholtz cylinder when said first housing is placed in said borehole, said gimballed mounting means being disposed in said housing so that said first induction coil rotates within said central opening of said Helmholtz cylinder whereby a first alternating electrical signal is induced in said first coil representative of the angle between the compound, of rotation of said first coil and said vertical magnetic axis of said Helmholtz cylinder, said first signal being thereby representative of the inclination angle of said borehole.

8. The apparatus of claim 5 wherein each of said first and second induction coils comprise a plurality of windings of electrical wire supported in a suitable potting compound, wherein said second induction coil includes a weight connected with the lower portion thereof for urging said coil to assume a vertical position, wherein said second coil rotating means (e) comprises:
ea. a second housing made of a nonmagnetic material permitting penetration therethrough of flux lines of the earth's magnetic field; and
eb. drive means for rotating said second coil at the same rotational rate as said first induction coil and for freely suspending said second coil while being rotated within said second housing whereby said second coil is rotated about a substantially vertical axis under the influence of said weight thereto connected and is subjected to flux lines of the earth's magnetic field thereby generating in said second coil a second alternating electrical signal the phase angle of which with respect to said first signal is representative of the azimuth angle of said borehole with respect to the earth's magnetic field.

9. The apparatus of claim 8 wherein said second housing is mounted to said first housing below said first housing, wherein said first induction coil includes a shaft extending therefrom, said first coil and shaft being rotatably mounted to said first and second flanges of said first housing for rotation therebetween defining said axis of rotation, said shaft being coupled with said synchronous motor for rotation thereof, the lower portion of said shaft extending through and below its rotatable mounting in said second flange of said first housing, said shaft including a first pair of electrical wires integrally mounted therewith connected with said first induction coil for carrying said first signal, and a second pair of electrical wires integrally mounted and extending below said second flange therewith, said shaft including a first and second pair of electrical sliprings thereon, said first pair of sliprings being connected with said first pair of electrical wires for carrying said first signal, said second pair of sliprings being connected with said second pair of wires, wherein said drive means (eb) of claim 8 comprises: a transversely resilient and rotationally firm drive member mounted to said lower portion of said shaft extending downwardly therefrom into said second housing, said second induction coil being mounted to the lower end of said drive member for rotation of said second coil within said second housing said second coil being urged to maintain a vertical axis of rotation by said weight, whereby said second coil is rotated at the same rate as said first coil about a substantially vertical axis, said second coil being connected to said second pair of wires for carrying said second signal generated thereby to said second pair of sliprings; and said apparatus of claim 8 further comprising: two pairs of electrical brushes contacting said sliprings and mounted in an electrically insulated manner for sensing said first and second alternating electrical signals.

10. The apparatus of claim 3 wherein said first rotating means (b) comprises:
ba. a first housing having a longitudinal axis of rotation for the rotation thereabout of said first coil with respect to said housing said first coil being mounted therein for rotation about said axis;
said housing being designed to provide at least a substantially parallel disposition of said axis of rotation of said first coil with respect to the longitudinal axis of said borehole when said housing is placed in said borehole, said housing being made of a magnetic material thereby shielding said first and second induction coils therein mounted from the earth's magnetic field;
bb. a motor mounted in said housing and coupled with said first coil for rotation of said first coil about said axis at a substantially uniform rate; wherein said means (ea) for rotating said second induction coil comprises a shaft rotatably mounted in said housing coupled with said first and second coils and coupled with said motor for rotation of said coils at substantially equal rates, wherein said directionally stable magnetic field producing means (eb) comprises: a gyrocompass mounted in said housing having an output shaft maintained by said gyrocompass in a substantially predetermined and fixed compass position, and magnetic field producing means coupled with said gyrocompass output shaft rotatably mounted in said housing at a position to provide a second magnetic field intersecting said second induction coil when rotating, said magnetic field producing means being maintained in a substantially fixed compass position by said gyrocompass thereby generating in said second coil a second alternating electrical signal the phase angle of which with respect to said first signal is representative of the azimuth direction of said borehole with respect to said predetermined gyrocompass output shaft position, the angle of inclination and azimuth angles of said borehole being determinable from said first and second signals.

11. The apparatus of claim 19 wherein said directionally stable magnetic means including said gyrocompass comprises:
a gyrocompass including an outer yoke, an inner gimbal pivotally mounted to said outer yoke, and a rotating inertia wheel rotatably mounted to said inner gimbal;
a shaft rotatably mounted in said housing for rotation about a longitudinal axis therein, said shaft being disposed in said housing so that the lower portion thereof is below said second induction coil (d), said gyrocompass outer yoke being fixed to the lower portion of said shaft so that the pivotal axis of said inner gimbal in said outer yoke bears a substantially transverse relationship with respect to said axis of operation of said shaft whereby said gyrocompass when aligned in a predetermined azimuth angle position tends to maintain said shaft in said predetermined azimuth angle position irrespective of the azimuth angle position of said housing when said housing is placed in a borehole; and second magnetic field producing means fixed to the upper portion of said shaft providing a second magnetic field with flux lines intersecting said second coil when said second coil is rotated thereby generating in said second coil a second alternating electrical signal the phase angle of which with respect to said first signal is representative of the azimuth angle of said borehole with respect to said predetermined gyrocompass azimuth angle position.

12. The apparatus of claim 11 wherein said second magnetic field producing means comprises: a ring magnet including a pair of diametrically opposed pole pieces, said ring magnet being gimbally mounted to the upper portion of said shaft in a position so that the magnetic field between said pole pieces intersects said second coil when rotating; and a weight suspended downwardly from said ring magnet for maintaining said magnet in a horizontal position, whereby said second coil is subjected to a second magnetic field which is maintained horizontal and the azimuth direction of which is controlled by said gyrocompass.

13. The apparatus of claim 3 wherein said first coil rotating means (b) comprises:
   ba. a first housing having a longitudinal axis of rotation for the rotation thereabout of said first coil with respect to said housing;
   said housing being designed to provide at least a substantially parallel disposition of said axis of rotation of said first coil with respect to the longitudinal axis of said borehole where said housing is placed in said borehole; and
   bb. drive means mounted in said housing and coupled with said first coil for rotation of said first coil about said axis;
   wherein said means (ea) for rotating said second induction coil comprises a shaft rotatably mounted in said housing coupled with said first and second coils and coupled with said motor for rotation of said coils at substantially equal rates, wherein said directionally stable magnetic field producing means (eb) comprises:
   a compass element having an inner space and a pair of magnets mounted with opposite magnetic poles facing each other across said space for providing a second magnetic field in said space said magnets having outer poles of opposite polarity interacting with the earth's magnetic field, said compass element being gimbally mounted in said housing for providing free pivotal movement of said compass element and in a position in said housing such that said second coil rotates at least in part within said space being subjected to said second magnetic field; and
   a weight suspended from said compass element for maintaining said compass element in a constant orientation such that said second magnetic field is maintained in a constant horizontal direction whereby said compass element due to the interaction of said outer poles with the earth's magnetic field and due to the influence of said weight subjects said second coil to said second magnetic field which is maintained horizontal and of constant azimuth direction.

14. The apparatus of claim 1 wherein said means (c) generates a substantially vertical magnetic field intersecting said first coil, said apparatus further comprising:

f. a phase meter operatively coupled to said first and second induction coils for measuring the phase angle between said first and second signals and for providing a third signal corresponding thereto; and g. computing means for generating a fourth signal corresponding to the azimuth angle of said borehole, said computing means being connected with said first induction coil and with said phase meter, said computing means generating said fourth signal substantially according to the following equation:

$$\theta_1 = \arc\sin\left[\frac{\sin\alpha}{\sqrt{1+\cos^2\alpha\,\tan_2\phi_1}}\right]$$

where:
$\theta_1$ = the borehole azimuth angle,
$\Phi_1$ = the borehole inclination angle in accordance with said first signal,
$\alpha$ = the phase angle between said first and second signals.

15. A method for directional logging of a borehole at any depth by providing signals representative of the inclination and azimuth angles thereof at said depth comprising the steps of:
   a. generating a first magnetic field maintained in a substantially vertical direction;
   b. sensing the inclination angle deviation between said magnetic field flux lines and the direction of said borehole at said depth by rotating a first induction coil about an axis substantially parallel with said borehole while subjecting said first coil to said first magnetic field, whereby a first alternating electrical signal is generated in said first coil representative of the angle between said magnetic field flux lines of predetermined direction and said axis of rotation, said first signal being thereby representative of the inclination angle of said borehole; and
   c. generating a second alternating electrical signal the phase angle of which with respect to said first signal is representative of the azimuth direction of said borehole by rotating a second induction coil at the same rotational rate as said first coil while said second coil is being subjected to a second magnetic field with a horizontal component maintained in a substantially predetermined direction with respect to a known azimuth direction, the inclination and azimuth angles of said borehole at said depth being determinable from said first and second signals.

16. The method of claim 15 wherein said second magnetic field is the earth's magnetic field.

17. The method of claim 15 wherein said second signal generating step (c) comprises the steps of:
   ca. generating a second magnetic field maintained in a substantially predetermined direction with respect to a known azimuth direction; and
   cb. generating a second alternating electrical signal the phase angle of which with respect to said first signal is representative of the azimuth angle of said borehole by rotating a second induction coil at the same rotational rate as said first coil while said second coil is subjected to said second magnetic field, the inclination and azimuth angles of said borehole at said depth being determinable from said first and second signals.

18. The method of claim 15 wherein said first and second coils are rotated at a substantially uniform rate.

19. The method of claim 16 wherein said first magnetic field is maintained in a substantially vertical direction.

20. The method of claim 19 wherein said first magnetic field is of substantially uniform intensity.

UNITED STATES PATENT OFFICE
CERTIFICATE OF CORRECTION

Patent No. 3,587,175      Dated June 28, 1971

Inventor(s) Fontaine C. Armistead

It is certified that error appears in the above-identified patent and that said Letters Patent are hereby corrected as shown below:

COLUMN 7, line 73, should read:

$$E_{II} = n A \omega (B_{II})_x \sqrt{1 - \sin^2\phi_1 \cos^2\theta_1} \; \sin \theta'_{II} \quad (6)$$

COLUMN 8, line 6, should read:

$$\cos \alpha = \frac{\cos \phi_1 \cos \theta_1}{\sqrt{\cos^2\phi_1 + \sin^2\phi_1 \sin^2\theta_1}} \quad (7A)$$

COLUMN 8, line 52, should read:

$$(\alpha + \theta'_I) \quad (10)$$

COLUMN 12, line 4, after "borehole", $\alpha$L should read $\Delta$L.

COLUMN 12, line 14, should read:

$$\overline{AC}^2 = \overline{AB}^2 + \overline{BC}^2 - 2 \overline{AB} \cdot \overline{BC} \cos(\pi - \eta + \theta_1) \quad (11)$$

COLUMN 14, line 47, change "are" (second occurrence) to --as--

COLUMN 17, line 41, change "compound," to --axis--

COLUMN 19, line 1, change "operation" to --rotation--

Signed and sealed this 22nd day of February 1972.

(SEAL)
Attest:

EDWARD M. FLETCHER, JR.      ROBERT GOTTSCHALK
Attesting Officer      Commissioner of Patents